United States Patent

[11] 3,586,015

| | | |
|---|---|---|
| [72] | Inventor | Ernest W. Kitzner<br>Allen Park, Mich. |
| [21] | Appl. No. | 5,081 |
| [22] | Filed | Jan. 22, 1970 |
| [45] | Patented | June 22, 1971 |
| [73] | Assignee | Ford Motor Company<br>Dearborn, Mich. |

[54] FUEL TANK VAPOR SEPARATOR SYSTEM HAVING MAGNETIC ATTITUDE SENSING MEANS
6 Claims, 4 Drawing Figs.

[52] U.S. Cl.................................................. 137/39,
 137/43, 137/412, 220/85 VS
[51] Int. Cl....................................................... F16k 31/02
[50] Field of Search........................................... 137/39, 43;
 220/44 R, 85 S, 85 V, 85 VR, 85 VS

[56] References Cited
UNITED STATES PATENTS
3,242,937 3/1966 Morin........................ 137/39

*Primary Examiner*—Robert G. Nilson
*Attorneys*—John R. Faulkner and Glenn S. Arendsen

ABSTRACT: A magnetically actuated electric switch responsive to a liquid fuel sensing device and a switch responsive to a pressure device are connected in series with each other and with a solenoid valve controlling fluid flow through a conduit connected to the upper interior of the fuel tank. The solenoid valve opens only when tank pressure exceeds a predetermined minimum and the conduit opening is free of liquid fuel. A magnet that moves in response to fuel tank attitude acts on the magnetically actuated switch to prevent the valve from opening whenever tank attitude varies from normal tank attitude by some predetermined amount.

3,586,015

FUEL TANK VAPOR SEPARATOR SYSTEM HAVING MAGNETIC ATTITUDE SENSING MEANS

SUMMARY OF THE INVENTION

This application relates to U.S. Pat. application Meyn Ser. No. 5,082, filed simultaneously herewith and entitled "Fuel Tank Vapor Separator System."

Evaporation losses from vehicle fuel tanks contribute in some undetermined degree to the contamination of the atmosphere. Various systems have been proposed for burning in the vehicle engine fuel vapors formed above the liquid fuel in the fuel tank. Many of these systems use an absorbent to contain those fuel vapors formed while the vehicle engine is not operating.

The presence of even small amounts of liquid fuel in these vapor systems interfere significantly with the vapor storage system and with the engine combustion process. A vapor separator system capable of preventing liquid fuel from reaching the storage system thus is an essential part of any such vapor separator system.

This invention provides a system for removing fuel vapors from a vehicle fuel tank that does not transmit liquid fuel regardless of tank attitude including an inverted attitude. Preventing liquid fuel transmission during an inverted tank attitude is necessary to reduce the fire hazard associated with a vehicle accident. The system comprises a source of electrical energy, which typically is the vehicle battery, and a conduit opening into the fuel tank. Vapor storage or consuming devices are connected to the other end of the conduit. An electrically operated valve is mounted in the conduit to control fluid flow through the conduit. Communicating with the tank interior is a pressure sensing device that controls a switch electrically in series with the valve. A liquid fuel sensing device controls a switch electrically in series with the valve and the pressure sensitive switch. The liquid fuel sensing device and the pressure sensing device permit the valve to open when fuel tank pressure exceeds a predetermined amount and the conduit opening is free of liquid fuel. A fuel tank attitude sensing device overrides the effects of the level sensing device and the pressure sensing device to prevent valve opening whenever the tank attitude acquires some predetermined variation from normal tank attitude.

The liquid fuel sensing device typically includes a magnetically actuated switch and a magnet movable by liquid fuel to actuate the switch. Another magnet movable by changes in tank attitude then conveniently is located adjacent the magnetically actuated switch so the same switch responds to liquid fuel level and tank attitude variations. A variation in tank attitude that exceeds a predetermined variation from normal attitude moves the second magnet to a position where its magnetic field disables the magnetically actuated switch to prevent opening of the solenoid valve regardless of the presence or absence of liquid fuel at the conduit opening. The predetermined variation typically is at least 90° and thus corresponds to a situation in which the vehicle is lying on its side or is completely upside down.

In a preferred arrangement, the conduit opens into the tank a short distance below the tank roof to provide a vapor space adjacent the tank roof, and the liquid fuel sensing device includes a buoyant member mounted movably in the opening of the conduit and movable from a rest position to a buoyed position when liquid fuel is present at the conduit opening. A magnet is embedded in the buoyant member and the magnetically actuated switch is located where the magnetic field thereof actuates the switch contacts when the buoyant member is in one position and deactuates the contacts when in the other position. The attitude sensing magnet moves into a position where its magnetic field prevents actuation of the magnetic switch whenever tank attitude varies from normal by the predetermined amount.

DETAILED DESCRIPTION

Figure 2:
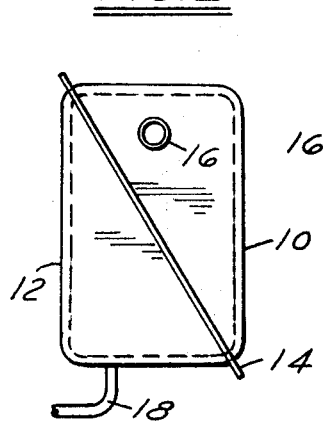
FIGS. 1 and 2 are side and end views of a typical vehicle fuel tank showing the relationship to the tank of an integrated mechanism containing the devices utilized in the system of this invention.
Figure 1:
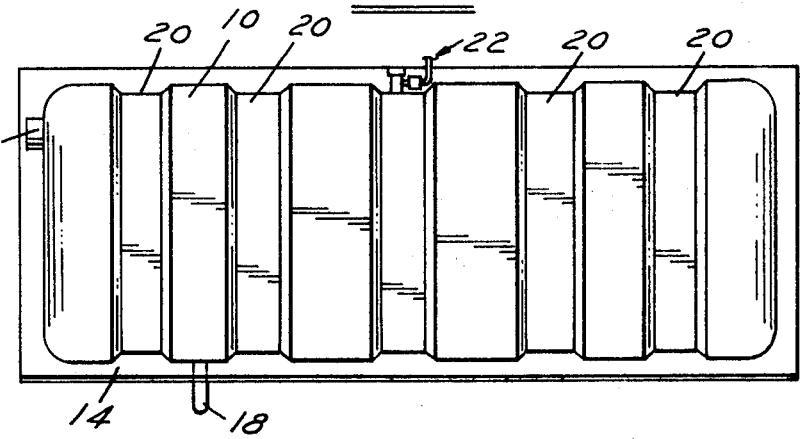

Referring to FIGS. 1 and 2, an automotive fuel tank typically is made in two sections 10 and 12 that are joined together along a diagonal flange 14. An opening 16 is formed in one side near the top of the tank for the fuel inlet tube (not shown) and the conventional fuel line 18 leading to the engine carburetor is located in the lower portion of the tank. A plurality of spaced depressions 20 are formed in the surfaces of the tank to impart greater rigidity thereto and an integrated valve mechanism 22 is mounted in the middle of the upper surface of the tank in one of the depressions.

Figure 3:
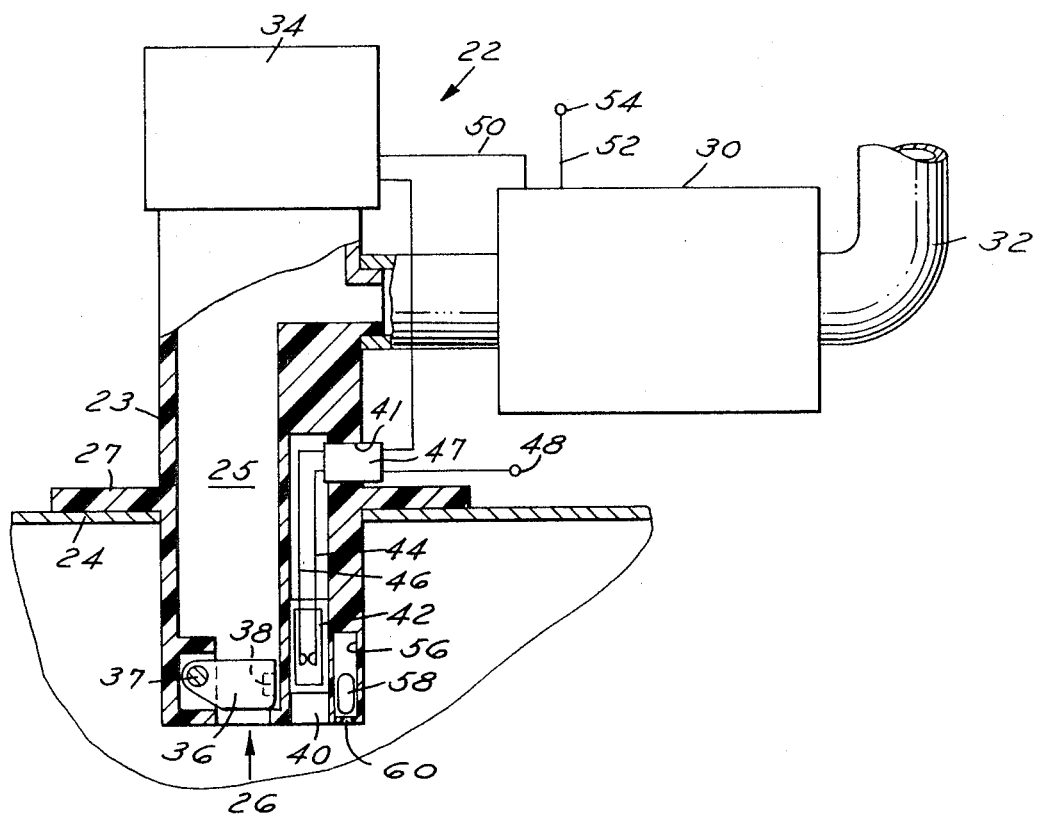
FIG. 3 is a partially sectioned elevation of the integrated mechanism in which a magnetically actuated reed switch and a buoyant magnetic member are used for level sensing and an additional magnetic member located adjacent the reed switch and movable by tank attitude disables the reed switch whenever tank attitude varies by a predetermined amount.

Turning to FIG. 3, mechanism 22 comprises a conduit 23 that extends through the tank roof 24 and terminates a short distance below the roof. A flange 27 formed on the conduit exterior bears against the tank roof to position the mechanism in place. Conduit 23 contains a passage 25 offset to one side of the conduit centerline that opens into the tank interior at opening 26. The conduit preferably is made of a plastic material compatible with the fuel such as a polyamide or polypropylene. Passage 25 extends upward from opening 26 for a short distance and then makes a right angle turn to a solenoid valve 30. The other side of solenoid valve 30 is connected to a tube 32 that leads to vapor storage or vapor consuming devices (not shown).

A pressure sensitive device 34 is mounted on top of conduit 23 in communication with passage 25. Pressure sensitive device 34 typically contains a flexible diaphragm movable in response to the pressure in passage 25 and a set of switch contacts that are opened or closed by movement of the diaphragm. A buoyant member 36 is mounted pivotally by pin 37 to the thinner wall of conduit 23 near opening 26. Member 36 typically is made of a foamed polymeric material compatible with the fuel and has a small magnet 38 embedded in the end opposite the pivot point.

An elongated hole 40 is formed in the thicker wall of conduit 23 adjacent magnet 38. The hole is parallel to the axis of passage 25 and extends above flange 27 where it connects with a lateral hole 41 formed in the conduit wall. Mounted sealingly in hole 40 is a magnetically sensitive and totally encapsulated reed switch 42. Reed switch 42 contains a pair of contacts, one of which is movable onto the other contact under the influence of a magnetic field. Electrical leads 44 and 46 connected to the contacts extend upward through the remainder of hole 40 and pass through a grommet 47 mounted in lateral hole 41. Outside of grommet 47, lead 44 connects with a terminal 48 and lead 46 connects with one of the switch contacts associated with pressure sensitive device 34. Another lead 50 connects the other switch contact of device 34 with the solenoid winding of valve 30 and a lead 52 connects the solenoid winding to a terminal 54.

Another hole 56 is formed in the thicker wall of conduit 23 radially outward from hole 40. Hole 56 is substantially parallel to hole 40. A bar-shaped magnet 58 is positioned slidably in hole 56 and the opening of the hole is closed by a plug 60.

Figure 4:
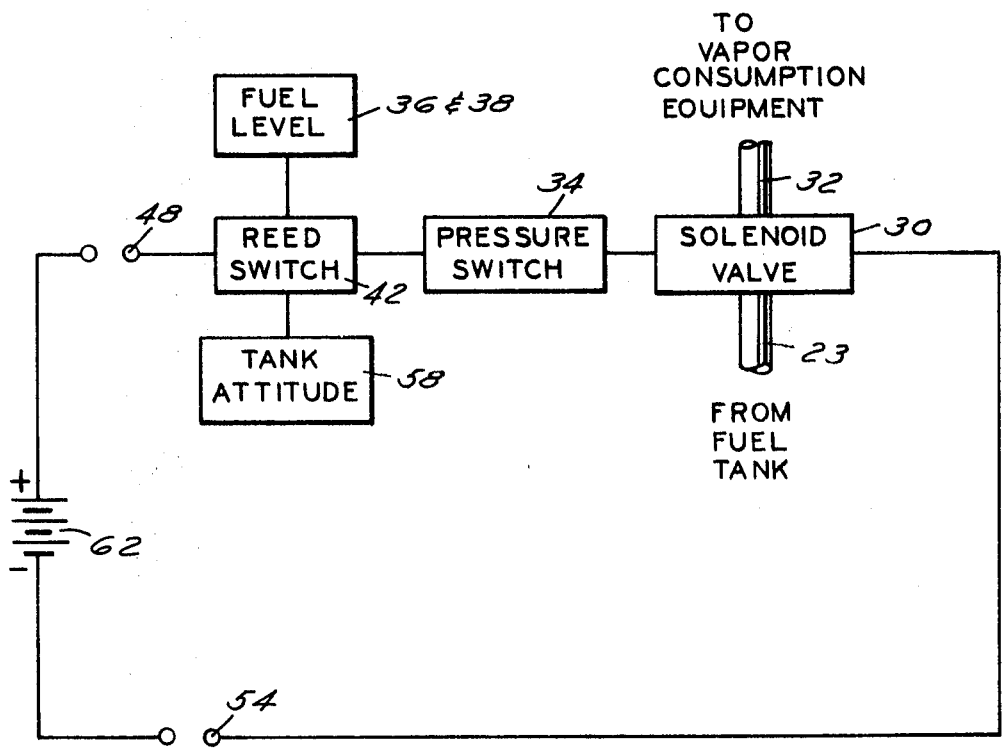
FIG. 4 is a schematic of the system.

Terminals 48 and 54 are connected to opposite sides of a vehicle battery 62 as shown in FIG. 4. As shown in the schematic of FIG. 4, reed switch 42 and the switch associated with pressure sensing device 34 are connected in series with the winding of solenoid valve 30. In a typical installation, solenoid valve 30 is normally closed to block communication between conduit 23 and tube 32. The switch associated with pressure sensing device 34 is normally open but closes when pressure in the fuel tank exceeds some predetermined value, typically about 0.5 p.s.i.

When opening 26 is clear of liquid fuel, buoyant member 36 pivots into a lowered position where the magnetic field provided by the magnet 38 is applied to reed switch 42, thereby closing the contacts of the reed switch. If tank pressure exceeds the predetermined value, the solenoid valve is actuated to connect passage 25 to tube 32, which vents fuel vapors through tube 32 to the storage or consuming devices. If tank pressure falls below the predetermined value (indicating that the fuel tank does not require vapor removal), or if liquid fuel at opening 26 raises buoyant member 36 to open the contacts of the reed switch (in which case liquid fuel could enter tube 32), the solenoid winding is deactivated and the solenoid valve remains closed.

Magnet 38 is polarized so its magnetic flux will allow one of the contacts of the reed switch to spring away from the other contact when the buoyant member is in a buoyed or raised position. Magnet 58 is polarized to draw one of the contacts of the reed switch away from the other contact when magnet 58 is in a raised position. Since magnet 58 must counteract the polarity of magnet 38, its field is opposite to and strong enough to overcome that of magnet 38. For example, if magnet 38 requires a north pole at its upper end and a south pole at its lower end to close the reed switch contacts when the magnet is in its rest position, magnet 58 has a south pole at its upper end and a north pole at its lower end. If vehicle attitude changes to the point where the force of gravity acting on magnet 58 moves it to the upper end of hole 56, the magnetic field of magnet 58 opens the contacts of reed switch 42 regardless of the position of magnet 38.

This system prevents liquid fuel from reaching conduit 32 in the event of any electrical failure and thus is a fail-safe system. The contacts of reed switch 42 must be open in the absence of a magnetic field and the float 36–magnet 38 assembly arranged to apply a magnetic field to close the contacts of the reed switch when opening 26 is free of fuel. Magnet 58 can be positioned adjacent reed switch 42 during normal tank attitudes and its magnetic field arranged to complement the magnetic field of magnet 38. Switch 42 then is designed so both magnetic fields must be present to close the switch contacts. When tank attitude varies by some predetermined amount from normal, magnet 58 slides away from the reed switch and the switch cannot be closed. Magnet life is improved by this arrangement.

Thus this invention provides a system for removing fuel vapors from a vehicle tank that prevents contamination of vapor consuming or storing equipment with a liquid fuel and also prevents the escape of liquid fuel in the event of an unusual vehicle attitude resulting from an accident.

I claim:

1. A system for removing fuel vapors from a fuel tank movable into varying attitudes while preventing removal of liquid fuel regardless of tank attitude including an inverted attitude comprising
    a source of electrical energy,
    a conduit opening into said fuel tank,
    electrically operated valve means coupled to said source of electrical energy for controlling fluid flow through said conduit,
    pressure sensing means communicating with the interior of said fuel tank, said pressure sensing means controlling a switch electrically in series with said electrically operated valve means,
    liquid fuel sensing means located in said tank for controlling a switch electrically in series with said electrically operated valve means and the switch controlled by the pressure sensing means, said pressure sensing means and liquid sensing means permitting opening of the valve means only when fuel tank pressure exceeds a predetermined amount and the conduit opening is clear of liquid fuel, and
    fuel tank attitude means for preventing fluid flow through said conduit when the fuel tank acquires an attitude exceeding a predetermined variation from normal tank attitude, said attitude means including magnetic means for preventing opening of said valve means when tank attitude exceeds said predetermined variation.

2. The system of claim 1 in which the liquid fuel sensing means includes a buoyant means mounted movably in the opening of the conduit, said buoyant means moving from a rest position to a buoyed position when liquid fuel is present at the conduit opening, a first magnetic means embedded in said buoyant means, the switch controlled by the liquid fuel sensing means being a normally open magnetically actuated reed switch located where the magnetic field of said first magnetic means closes said switch when the buoyant means is in its rest position, and the attitude means comprises a second magnetic means movable by said predetermined variation in tank attitude to a position where said reed switch is open regardless of the location of the first magnetic means.

3. The system of claim 2 in which said second magnetic means comprises a magnet slidably mounted in a passage adjacent the switch controlled by the liquid fuel sensing means.

4. The system of claim 3 in which the second magnetic means normally is positioned adjacent the switch controlled by the liquid fuel sensing means and is moved away from the switch when tank attitude exceeds said predetermined variation from normal attitude, the magnetic fields of said first and second magnetic means complementing each other to close the contacts of the switch only when both magnetic means are adjacent the switch.

5. The system of claim 4 in which the conduit opens into the tank a short distance below the tank roof to provide a vapor space within the tank adjacent the tank roof, and the liquid fuel sensing means is mounted in said conduit opening.

6. The system of claim 1 in which the conduit opens into the tank a short distance below the tank roof to provide a vapor space within the tank adjacent the tank roof, and the liquid fuel sensing means is mounted in said conduit opening.